United States Patent [19]
Gordon, II et al.

[11] Patent Number: 5,872,552
[45] Date of Patent: *Feb. 16, 1999

[54] ELECTROPHORETIC DISPLAY

[75] Inventors: Joseph Grover Gordon, II; Mark Whitney Hart, both of San Jose; Andrew Marian Homola, Morgan Hill; Dennis Richard McKean, Cupertino; Lawrence Brian Schein, San Jose; Barton Allen Smith, Campbell; Sally Ann Swanson, San Jose, all of Calif.

[73] Assignee: International Business Machines Corporation, Armonk, N.Y.

[*] Notice: The term of this patent shall not extend beyond the expiration date of Pat. No. 5,745,094.

[21] Appl. No.: 864,806

[22] Filed: May 29, 1997

Related U.S. Application Data

[63] Continuation of Ser. No. 365,270, Dec. 28, 1994, Pat. No. 5,745,094.

[51] Int. Cl.⁶ ................................................... G09G 3/34
[52] U.S. Cl. .......................................... 345/107; 359/296
[58] Field of Search ....................... 345/48, 107; 359/296

[56] References Cited

U.S. PATENT DOCUMENTS

| | | | |
|---|---|---|---|
| 3,612,758 | 10/1971 | Evans et al. | 178/5.4 R |
| 4,218,302 | 8/1980 | Dalisa et al. | 204/299 R |
| 4,272,596 | 6/1981 | Harbour et al. | 430/37 |
| 4,620,916 | 11/1986 | Zwemer et al. | 204/299 R |
| 4,648,956 | 3/1987 | Marshall et al. | 204/299 EC |
| 4,650,288 | 3/1987 | White | 350/362 |
| 4,833,464 | 5/1989 | Di Santo | 345/148 |
| 5,276,438 | 1/1994 | DiSanto | 345/107 |
| 5,293,528 | 3/1994 | DiSanto | 345/107 |
| 5,298,833 | 3/1994 | Hou | 313/483 |

FOREIGN PATENT DOCUMENTS

| | | | |
|---|---|---|---|
| 51-130241 | 11/1976 | Japan | G02F 1/17 |
| 55-071782 | 5/1980 | Japan | C09K 9/02 |
| 55-105227 | 8/1980 | Japan | G02F 1/19 |
| 59-165028 | 9/1984 | Japan | G02F 1/19 |
| 60-087317 | 5/1985 | Japan | G02F 1/19 |
| 60-189731 | 9/1985 | Japan | G02F 1/19 |
| 02-189525 | 7/1990 | Japan | G02F 1/167 |
| 02-223932 | 9/1990 | Japan | G02F 1/167 |
| 02-223933 | 9/1990 | Japan | G02F 1/167 |
| 02-284123 | 11/1990 | Japan | G02F 1/167 |
| 02-284128 | 11/1990 | Japan | G02F 1/167 |

(List continued on next page.)

OTHER PUBLICATIONS

Beilin et al., "2000–Character Electrophoretic Display", SID 86 Digest, pp. 136–140.

Chiang, "Conduction Mechanism of Charge Control Agents Used in Electrophoretic Display Devices", Proceeding of the S.I.D., vol. 18, 3rd/4th Quarters 1977, pp. 275–282.

Chiang, "Electrophoretic Displays: The State of the Art", IEEE, 1980, pp. 10–12.

Croucher et al., "Electrophoretic Display: Materials as Related to Performance", Photographic Science and Engineering, vol. 25, No. 2, Mar./Apr. 1981, pp. 80–86.

Croucher et al., "Some Physicochemical Properties of Electrophoretic Display Materials", Ind. Eng. Chem. Prod. Res. Dev., vol. 20, No. 2, 1981, pp. 324–329.

Dalisa, "Electrophoretic Display Technology", Proceeding of the S.I.D., vol. 18, 1st Quarter 1977, pp. 43–50.

Dalisa, "Electrophoretic Display Technology", IEEE Transactions on Electron Devices, vol. ED–24, No. 7, Jul. 1977, pp. 827–834.

(List continued on next page.)

Primary Examiner—Jeffrey Brier
Attorney, Agent, or Firm—Robert B. Martin

[57] ABSTRACT

The invention relates to an ambient light electrophoretic display comprising a plurality of cells containing a suspension of charged pigment particles in a light-transmissive fluid. Each cell comprises a light-transmissive front window, a nonobstructing collecting electrode and counter electrode disposed in the cell, and a panel having a reflective or absorbing surface.

2 Claims, 2 Drawing Sheets

FOREIGN PATENT DOCUMENTS

| | | | |
|---|---|---|---|
| 03-266818 | 11/1991 | Japan | G02F 1/167 |
| 03-284729 | 12/1991 | Japan | G02F 1/167 |
| 04-127190 | 4/1992 | Japan | G09F 9/37 |
| 04-166917 | 6/1992 | Japan | G02F 1/167 |
| 04-166918 | 6/1992 | Japan | G02F 1/167 |

OTHER PUBLICATIONS

Dalisa, "Electrophoretic Displays", Top. Appl. Phys., vol. 40, 1990, pp. 213–232.

Fitzhenry, "Identification of a Charging Mechanism Using Infrared Spectroscopy", Applied Spectroscopy, vol. 33, No. 2, 1979, pp. 107–110.

Fitzhenry, "Optical Effects of Adsorption of Dyes on Pigment Used in Electrophoretic Image Display", Applied Optics, vol. 18, No. 19, Oct. 10, 1979, pp. 3332–3337.

Fitzhenry–Ritz, "Optical Properties of Electrophoretic Image Display", IEEE, 1980, pp. 13–25.

Fitzhenry–Ritz, "Optical Properties of Electrophoretic Image Displays", IEEE Transactions on Electron Devices, vol. ED–28, No. 6, Jun. 1981, pp. 726–735.

Hopper et al., "An Electrophoretic Display, Its Properties, Model, and Addressing", IEEE Transactions on Electron Devices, vol. ED–26, No. 8, Aug. 1979., pp. 1148–1152.

Liebert et al., "A 512 Character Electrophoretic Display", IEEE, 1980, pp. 26–30.

Murau et al., "The Understanding and Elimination of Some Suspension Instabilities in an Electrophoretic Display", Journal of Applied Physics, vol. 49, No. 9, Sep. 1978, pp. 4820–4829.

Murau, "Characteristics of an X–Y Addressed Electrophoretic Display (EPID)", SID 84 Digrst, 1984, p. 141.

Novotny et al., "Optical and Electrical Characterization of Electrophoretic Displays", Journal of the Electrochemical Society, vol. 126, No. 12, Dec. 1979, pp. 2211–2216.

Novotny, "Applications of Nonaqueous Colloids", Colloids and Surfaces, vol. 24, 1987, pp. 361–375.

Shiffman et al., "An Electrophoretic Image Display with Internal NMOS Address Logic and Display Drivers", Proceedings of the SID, vol. 25, No. 2, 1984, pp. 105–115.

Singer et al., "An X–Y Addressable Electrophoretic Display", Proceeding of the S.I.D., vol. 18, 3rd/4th Quarters, 1977, pp. 255–266.

Swank et al., "The Development of a Self–contained Instant–display Erasable Electrophoretic X–ray Imager", Journal of Applied Physics, vol. 50, No. 10, Oct. 1979, pp. 6534–6542.

Vance, "Optical Characteristics of Electrophoretic Displays", Proceeding of the S.I.D., vol. 18, 3rd/4th Quarters, 1977, pp. 267–274.

Yamaguchi et al., "Equivalent Circuit of Ion Projection–driven Electrophoretic Display", IEICE Transactions, vol. E74, No. 12, Dec. 1991, pp. 4152–4156.

ELECTROPHORETIC DISPLAY

This is a continuation of application Ser. No. 08/365,270 filed on Dec. 28, 1994, now U.S. Pat. No. 5,745,094.

TECHNICAL FIELD

The present invention relates to an electrophoretic display, and in particular relates to a reflective electrophoretic display.

BACKGROUND OF THE INVENTION

An electrophoretic display generally comprises a suspension of charged pigment particles colloidally dispersed in a liquid of matching specific gravity contained in a cell comprising two parallel and transparent conducting electrode panels. The charged particles are transported between the electrode panels under the influence of an electric field. In one embodiment of an electrophoretic display disclosed in Hou, U.S. Pat. No. 5,298,833, black particles are suspended in a back-lighted clear medium. When the black particles are moved against the front transparent electrode, there is displayed a black image contrasted against a light background. Unfortunately, such a display requires a back light, and therefore it is not desirable for notebook computers due to power and weight requirements of the backlight. Dalisa, "Electrophoretic Display Technology", *Proceedings of S.I.D.*, Vol. 18, No. 1, 1977, pp. 43–50; and "Electrophoretic Displays", *Topics of Applied Physics*, Vol. 40, 1980, pp. 213–232, discloses a reflective electrophoretic display (e.g., no back light) comprising charged pigment dispersed in a dyed liquid of contrasting color enclosed in a cell comprising parallel and transparent conducting front and rear electrode panels. When the pigment is packed on the front electrode panel, the color of the pigment will be seen by the observer with ambient light. When the pigment is on the rear electrode panel, the ambient room light is absorbed and scattered by the dyed liquid and the color of the dye is observed. Because the display is passive and requires no back light, the display consumes very little power. To achieve the greatest contrast, light particles with large scattering coefficients such as titanium dioxide are suspended in a dark dyed medium. Displays utilizing this approach, however, do not produce highly contrasted images and generally have low reflectivity. When their dye concentration is low, the suspension, and hence the background, appears grayish. When their dye concentration is high, the light state is not bright because the dark dye is easily noticed in the spaces between the particles and in the spaces between the particles and the viewing plate.

Therefore, there is a continuing need in the art for an electrophoretic display having low power consumption and good contrast and brightness.

It is therefore an object of the present invention to provide an improved electrophoretic display having low power consumption and good image contrast. Other objects and advantages will become apparent from the following disclosure.

SUMMARY OF THE INVENTION

The present invention relates to an ambient light electrophoretic display comprising a plurality of cells containing a suspension of charged pigment particles in a light-transmissive fluid. Each cell comprises a light-transmissive front window, a nonobstructing collecting electrode disposed in the cell, a counter electrode disposed in the cell, and a panel which has a light-reflective or absorbing surface. The nonobstructing collecting electrode is preferably disposed on the panel which has a light-reflective or absorbing surface and is preferably located at the rear of the cell. In the collected state with the pigments collected by the collecting electrode, incident ambient light is reflected off or absorbed by the rear surface of the cell. Preferably, the light is reflected off the rear panel and back to the viewer.

A more thorough disclosure of the present invention is presented in the detailed description which follows and from the accompanying drawings.

DETAILED DESCRIPTION OF THE INVENTION

Figure 1:
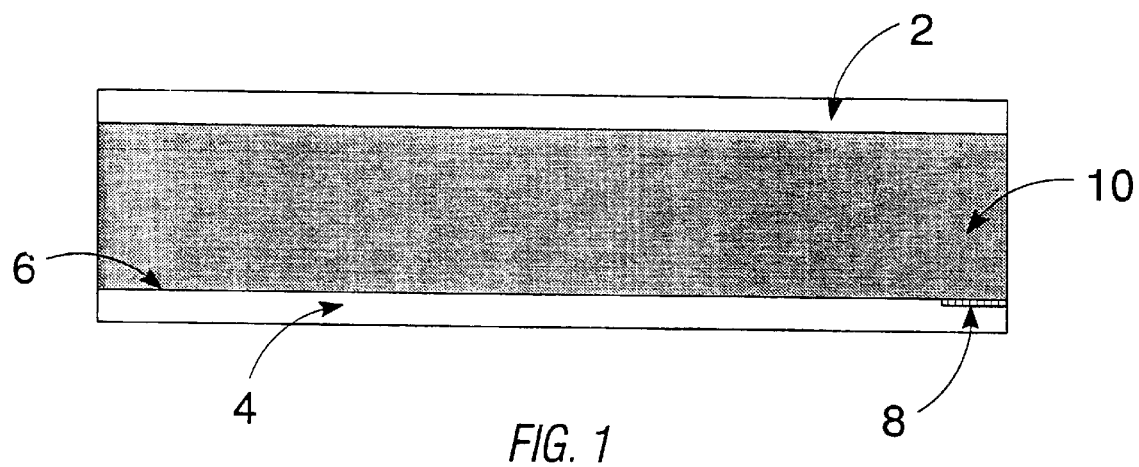
FIG. 1 is a sectional view of an electrophoretic display cell of the present invention in the dark-image state.

The present invention relates to an ambient light electrophoretic display comprising a plurality of cells, each cell containing a suspension of charged pigment particles in a light-transmissive fluid. Each cell comprises a light-transmissive front window, a counter electrode, a nonobstructing collecting electrode, and a panel which has a light-reflective or absorbing surface. The panel covers substantially all of the horizontal (lateral) area of the cell. In a preferred collected state, the pigment particles are collected on the nonobstructing collecting electrode which enables ambient light to be reflected off the panel and back to the viewer. The cell operates without need of any contiguous artificial electric light source (e.g., backlight).

The pigment particles preferably have stable properties and single polarity for better contrast, resolution, and dispersibility. Preferably, the pigment particles are opaque. The pigment particle can be black or colored such as white, red, green, or the like. Suitable pigment particles include:

Inorganic: Cadmium Red
    Cadium sulfo-selenide (black)
    Chromium oxide (green)
    Iron oxides (black)
    Iron oxides (red)
    Lead chromate (yellow)
    Manganese dioxide (brown)
    Silicon monoxide (reddish brown)
    Sulfur (yellow)
    Vermilion Red
    Carbon black
    Titanium oxide Organic: Anthracene (fluorescent blue)
    Anthracene (fluorescent yellow)
    Phthalocyanine Blues
    Phthalocyanine Greens Suitable opaque pigment particles include:
  Stirling NS N 77Y (Pigment Black 7)
  Cabot Mogul L (black)
  Carbon Black
  Monastral® Green G (C.I. Pigment Green 7)
  Monastral® Blue G (C.I. Pigment Blue 15)
  Toluidine Red Y (C.I. Pigment Red 3)
  Quindo® Magenta (Pigment Red 122)
  Indo® Brilliant Scarlet (Pigment Red 123)

Toluidine Red B (C.I. Pigment Red 3)
Watchung® Red B (C.I. Pigment Red 48)
Permanent Rubine F6B13-1731 (Pigment Red 184)
Hansa® Yellow (Pigment Yellow 98)
Dalamar® Yellow (Pigment Yellow 74)
Toluidine Yellow G (C.I. Pigment Yellow)
Monastral® Blue B (C.I. Pigment Blue 15)
Monastral® Green B (C.I. Pigment Green 7)
Pigment Scarlett (C.I. Pigment Red 60)
Anric Brown (C.I. Pigment Brown 6)

Other suitable pigment particles will be known to those skilled in the art such as those disclosed in U.S. Pat. Nos. 5,200,289 and 4,631,244.

The pigment particles are colloidally suspended in a light-transmissive fluid, preferably clear fluid. The fluid is preferably dielectric and substantially free of ions. The fluid preferably has minimum solvent action on the pigments and a specific gravity about equal to the pigment particles. Suitable solvents include silicone fluid such as (dimethyl polysiloxane), and hydrocarbons such as decane, dodecane, N-tetradecane, xylene, Sohio odorless solvent (a kerosene fraction available from Exxon Company), toluene, hexane and Isopar® G, H, K, L, M, and V and Norpar® 12, 13, and 15 (branched and linear saturated aliphatic hydrocarbons available from Exxon Company).

The pigments are dispersed in the fluid to form a stable colloidal suspension. Optionally, other components can be added to the suspension such as charge control additives, dispersants, and surfactants to improve the performance of the suspension. Suitable additives include sodium dioctylsulfonsuccinate, zirconium octoate, and metal soaps such as lecithan, barium petronate, calcium petronate, alkyl succinimide, iron naphthenate, and polyethylene glycol sorbitan stearate.

Figure 2:
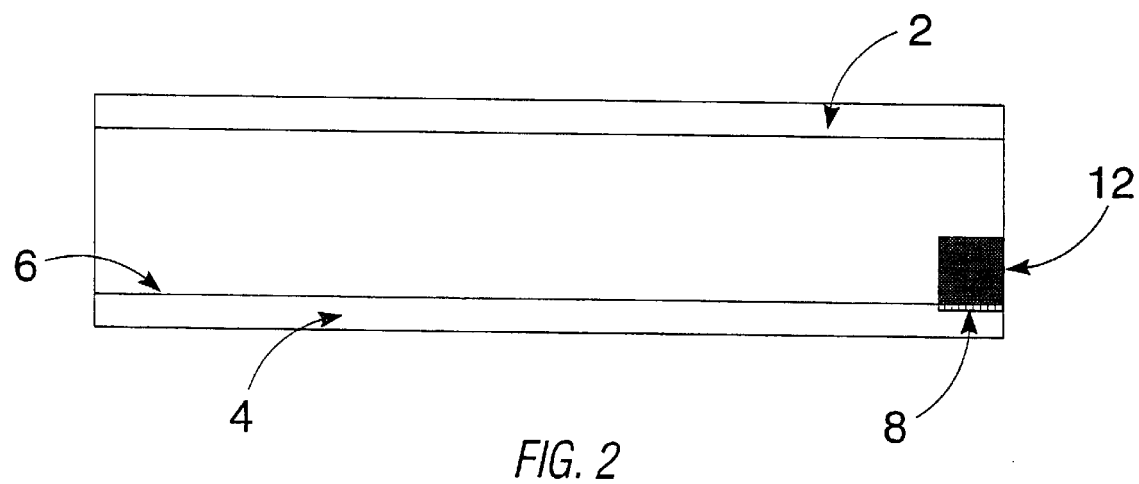
FIG. 2 is a sectional view of an electrophoretic display cell of the present invention in the light-image state.

Referring to FIGS. 1 and 2, there is shown a preferred embodiment electrophoretic display cell in accordance with the present invention. The cell generally comprises a front light-transmissive counter electrode 2 (functioning as the front window), a horizontal rear panel 4 having a light-reflective or absorbing surface 6 facing the electrode 2, and a nonobstructing collecting electrode 8 disposed in the cell and spaced from the front electrode. The colloidal pigment suspension 10 is disposed in the space between the front electrode 2 and the rear panel 4.

The light-transmissive counter electrode of the embodiment in FIG. 1 can be suitably formed by disposing onto a glass plate a layer of conductive, light-transmissive material such as indium tin oxide.

The surface 6 of rear panel 4 preferably reflects incident ambient light back through the cell and the light-transmissive front panel. The reflective surface is preferably silvered to enhance the degree of reflectivity. Alternatively, the panel can have a reflective colored surface such as a white-reflective surface. Suitably, the rear panel 4 can be formed from aluminum, chromium, or nickel. The reflective surface preferably has a reflectivity of greater than about 60%, preferably greater than about 85%, and more preferably greater than 90%. If the panel is light absorbing, it can have a black-absorbing surface such as a black-painted surface.

The nonobstructing collecting electrode 8 is sized and/or positioned so that when the electrode has collected and is coated with the pigment particles, the electrode and pigment particles do not unacceptably interfere with the transmission of incident light through the light-transmissive fluid. (Substantially all of the incident light is transmitted through the cell.) For example, the electrode can be made a small size (e.g., square or pedestal shaped or narrow line) and positioned along the side of the rear panel (line electrode) or at the corner (square) such as shown in FIG. 1. Alternatively, the electrode can be disposed vertically along the side of the cell out of the line of sight of the viewer.

In FIG. 1, in the dark or opaque state (noncollected state), the pigment particles are generally uniformly dispersed in the suspension between the front counter electrode 2 and rear reflective panel 4. The incident ambient light is either absorbed by the pigment particles to create a black image or alternatively reflected to create a colored image. In FIG. 2, the cell is in the collected state. The pigments 12 in the suspension are attracted to and collected on the nonobstructing collecting electrode 8. This permits the transmission of incident ambient light through the cell and reflects off the reflective surface 6 and back through the cell to create a light image. The light image has good contrast against the black or pigment-colored image of FIG. 1. If the cell in FIG. 2 had a light-absorbing surface 6 on panel 4, the state shown in FIG. 2 would be a dark image. The process for making electrophoretic display cells is known in the art such as disclosed in U.S. Pat. Nos. 4,218,302 and 4,650,288; and Dalisa, "Electrophoretic Displays", *Top. Appl. Phys.*, Vol. 40, pp. 213–232, Display Devices (1980), the disclosures of which are incorporated herein by reference.

Figure 3:
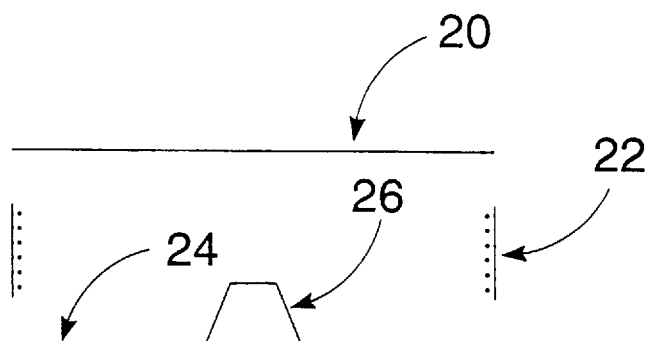
FIG. 3 is an alternative embodiment of an electrophoretic display cell of the present invention.

Referring to FIG. 3, there is shown an alternative embodiment of the display cell of the present invention comprising a light-transmissive front window 20, vertical collecting electrodes 22 disposed on the side of the cell between the front and rear of the cell, rear panel 24 having a reflective surface, and pedestal-shaped counter electrode 26. In the dark state, the pigment particles are generally uniformly dispersed in the suspension.

Figure 4:
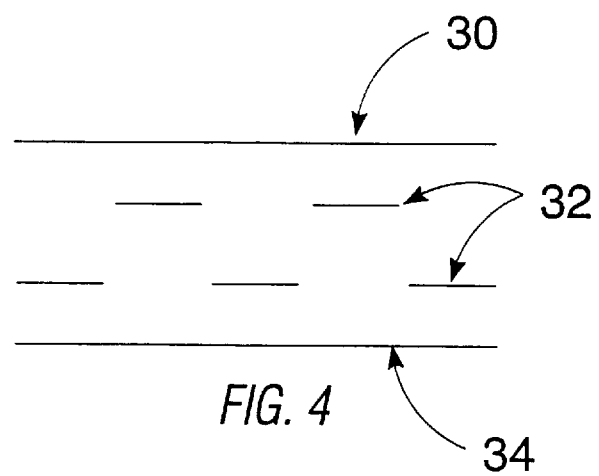
FIG. 4 is another alternative embodiment of an electrophoretic display cell of the present invention.

Referring to FIG. 4, there is shown another alternative embodiment of the display cell of the present invention comprising light-transmissive front counter electrode panel 30, reflecting horizontal panel segments 32, and collecting electrode 34. In the dark state, the pigments are disposed on the front panel electrode and, in the light state, the pigments are disposed on the collecting electrode behind the reflective panel segments 32.

Figure 5:
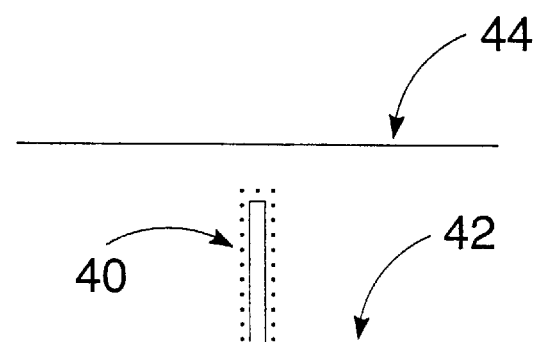
FIG. 5 is another alternative embodiment of an electrophoretic display cell of the present invention.

Referring to FIG. 5, there is shown another alternative embodiment of the display cell of the present invention. The cell comprises pedestal-shaped collecting electrode 40, a light-transmissive counter electrode 42 disposed over a rear panel having a reflecting surface, and a third light-transmissive front electrode 44. The dark-image state can be achieved by disposing the particles on the front electrode or counter electrode, or dispersing the particles in the suspension. Alternatively, the counter electrode can have a light-reflecting surface and function as the counter electrode and rear panel.

The following example is a detailed description of a display of the present invention. The details fall within the scope of, and serve to exemplify, the more general description set forth above. The example is presented for illustrative purposes only, and are not intended as a restriction on the scope of the invention.

EXAMPLE

Electrophoretic Display Cell

A 10 mm square cell was constructed comprising (i) a front light-transmissive electrode made of indium tin oxide (ITO), (ii) a rear glass panel having a 3 mm ITO strip along one side, and (iii) 1.1 mm teflon spacers between the front electrode and rear glass panel. A light-reflecting white paper was placed behind the rear glass panel. The cell was filled with Versatec Black liquid toner diluted 1:11 with Versatec solvent. The dispersed pigment suspension gave a dark image to the cell. The electrodes were then charged and pigment was collected on the rear strip electrode to provide a white-reflective image.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

What is claimed is:

1. An electrophoretic cell for use in displays containing a suspension of charged pigment particles in a light-transmissive fluid, the cell comprising:

(a) a light-transmissive front window;

(b) a nonobstructing collecting electrode disposed at the side of the cell; and (c) a pedestal shaped counter electrode.

2. An electrophoretic display comprising a plurality of cells containing a suspension of charged pigment particles in a light-transmissive fluid, each cell comprising:

(a) a light-transmissive front window;

(b) a nonobstructing collecting electrode disposed at the side of the cell;

(c) a pedestal shaped counter electrode; and (d) rear panel.

* * * * *